US012390841B2

(12) United States Patent
Lisboa Santos et al.

(10) Patent No.: US 12,390,841 B2
(45) Date of Patent: Aug. 19, 2025

(54) SYSTEM FOR UNBLOCKING OR CLEANING DUCTS BY MEANS OF A CONTROLLED LOCAL REACTION

(71) Applicants: Petróleo Brasileiro S.A.—Petrobras, Rio de Janeiro (BR); Universidade Federal Do Rio Grande Do Sul—UFRGS, Porto Alegre (BR)

(72) Inventors: Hugo Francisco Lisboa Santos, Rio de Janeiro (BR); Giovanni Souza De Andrade, Cachoeirinha (BR); Cedric Hernalsteens, Niteroi (BR); Ney Robinson Salvi Dos Reis, Rio de Janeiro (BR); Eduardo Donadel Basso, Porto Alegre (BR); Andre Manoel Goja Ferreira, Rio de Janeiro (BR); Eduardo Andre Perondi, Porto Alegre (BR); Alvaro Bruscato Schmidt, Porto Alegre (BR); Fabiano Disconzi Wildner, Porto Alegre (BR); Rafael Antonio Comparsi Laranja, Porto Alegre (BR); Tiago Becker, Porto Alegre (BR); Jose Leandro Rosales Luz, Porto Alegre (BR); Eder Goncalves Dorneles, Porto Alegre (BR); Bruno Barbosa Castro, Rio de Janeiro (BR)

(73) Assignees: Petróleo Brasileiro S.A.—Petrobras, Rio de Janeiro (BR); Universidade Federal Do Rio Grande Do Sul—UFRGS, Porto Alegre (BR)

( * ) Notice: Subject to any disclaimer, the term of this patent is extended or adjusted under 35 U.S.C. 154(b) by 707 days.

(21) Appl. No.: 17/620,572

(22) PCT Filed: Jun. 8, 2020

(86) PCT No.: PCT/BR2020/050203
§ 371 (c)(1),
(2) Date: Dec. 17, 2021

(87) PCT Pub. No.: WO2020/252547
PCT Pub. Date: Dec. 24, 2020

(65) Prior Publication Data

US 2022/0410223 A1 Dec. 29, 2022

(30) Foreign Application Priority Data

Jun. 19, 2019 (BR) ...................... 10 2019 012853 4

(51) Int. Cl.
*B08B 9/049* (2006.01)
*E21B 37/06* (2006.01)

(52) U.S. Cl.
CPC .............. *B08B 9/049* (2013.01); *E21B 37/06* (2013.01); *B08B 2209/04* (2013.01)

(58) Field of Classification Search
CPC ...................................................... E21B 37/06
See application file for complete search history.

(56) References Cited

U.S. PATENT DOCUMENTS 4,475,596 A * 10/1984 Papst ...................... E21B 43/24 166/303
6,415,722 B1 7/2002 Reis
(Continued)

FOREIGN PATENT DOCUMENTS

CN 105225370 A * 1/2016
WO 0194041 A1 12/2001
(Continued)

OTHER PUBLICATIONS

Machine translation of WO-2019114012-A1, dated Jun. 20, 2019. (Year: 2019).*
(Continued)

*Primary Examiner* — Michael E Barr
*Assistant Examiner* — Kevin G Lee

(74) *Attorney, Agent, or Firm* — Morrison & Foerster LLP

(57) ABSTRACT

The present invention proposes the use of a tool (13) that is connected to a device for locomotion, such as, for example, a robot, and provided with an umbilical cable (06) to bring about a controlled reaction near the blockage, in order to remove it. In order to carry out that controlled reaction, an injection, and control system is used, which may be a closed loop control system.

9 Claims, 5 Drawing Sheets

(56) References Cited

U.S. PATENT DOCUMENTS

| | | | | |
|---|---|---|---|---|
| 2002/0153140 | A1* | 10/2002 | Botrel | E21B 36/005 166/61 |
| 2005/0115588 | A1 | 6/2005 | Farris | |
| 2005/0217855 | A1 | 10/2005 | Stave | |
| 2007/0151475 | A1 | 7/2007 | Nicholson | |
| 2010/0139924 | A1* | 6/2010 | Abney | E21B 36/005 166/335 |
| 2014/0158358 | A1* | 6/2014 | Pantano | C09K 8/60 166/162 |
| 2014/0318789 | A1* | 10/2014 | Mancini | C09K 8/524 166/61 |
| 2020/0271478 | A1* | 8/2020 | Schmauder | B08B 9/0436 |

FOREIGN PATENT DOCUMENTS

| | | | | |
|---|---|---|---|---|
| WO | 2011084042 | A1 | 7/2011 | |
| WO | 2015187122 | A1 | 12/2015 | |
| WO | WO-2019114012 | A1 * | 6/2019 | B08B 9/049 |
| WO | 2020252547 | A1 | 12/2020 | |

OTHER PUBLICATIONS

International Search Report and Written Opinion received for PCT Application No. PCT/BR2020/050203, mailed on Aug. 11, 2020, 19 Pages.

Halliburton (2018) "SureTherm Service: Targeted Heat Placement in Remote Locations to Remove Pipeline Deposits, Pipeline and Process Services, Pipeline Remediation Services", https://www.halliburton.com/en/error/404?bath=/content/dam/ps/public/pps/contents/data_sheets/web/suretherm-service-h07615.pdf, 2 Pages.

* cited by examiner

SYSTEM FOR UNBLOCKING OR CLEANING DUCTS BY MEANS OF A CONTROLLED LOCAL REACTION

CROSS-REFERENCE TO RELATED APPLICATIONS

This application is a national phase application, filed under 35 U.S.C. § 371, of PCT International Patent Application No. PCT/BR2020/050203, filed Jun. 8, 2020, and claims benefit of priority to Brazilian application BR 10 2019 012853 4, filed on Jun. 19, 2019, the disclosures of all of which are incorporated herein by reference in their entirety.

FIELD OF THE INVENTION

The present invention is in relation to a tool connected to a locomotion device, such as, for example, a robot with an umbilical cable, to bring about a controlled reaction near the obstruction in order to remove it. To obtain that controlled reaction, an injection and control system is used, which may be a closed loop control system.

DESCRIPTION OF THE STATE OF THE ART

The production of oil from undersea wells almost always involves drilling wells and connecting them to Stationary Production Units, or SPUs. This interconnection is done through rigid or flexible ducts. Additionally, those units may be connected to other units or to stations on land, also through rigid or flexible ducts. Those ducts may eventually become restricted or blocked, which may be caused, for example, by hydrates and/or paraffins. Hydrates are solid compounds in which a large quantity of methane is imprisoned by a crystalline structure of water molecules. This creates a solid with a consistency that is similar to ice. They occur when there is a mixture of methane and water under conditions of high pressure and low temperature. However, obstructions caused by paraffin are related to the homonymous fraction of oil, that is, alkanes with a chain between 20 and 40 atoms of carbon. Those components, when at low temperature, tend to be deposited on the walls of tubes, causing obstruction and eventually blockage. Such blockages prevent production from continuing. In some situations it is possible to unblock the line by using devices known as a flexitubes, or coiled tubing, which are flexible tubes made of steel, rolled in the form of a spool, and that are pushed inside the line. However, this equipment cannot be moved efficiently over long distances inside the duct, in ducts whose geometry is complex, or in an ascending direction. In addition, many platforms do not have the capacity to operate coiled tubing due to their weight.

Currently the solution that is commonly used is to try to unblock these lines from the SPU. Different techniques are used to do this, such as depressurization and injection of solvents. These techniques may be used from the SPU, from a drill ship, or from another facility connected to the line. In obstructions caused by hydrates, a flexitube may be inserted from the SPU. This is possible in cases in which the configuration of the riser is a free-hanging catenary and when the obstruction caused by the hydrate is close to the vertical section. It is not applicable in risers with a lazy wave, lazy-S or equivalent configurations. It is also not applicable in situations in which the hydrate was formed along the vertical section, which is the majority of cases. In cases in which it is applicable, the flexitube may be lowered from the SPU and the line depressurized in order to break up the hydrate.

In addition to the limitations of configuration and distance, depressurization is a technique that presents risks. These risks are associated with the large pressure differential that is created between the ends of the hydrate plug. The pressure differential causes the hydrate to move at high speed towards the SPU, which may cause damage upon arrival.

In the cases in which the flexitube cannot be implemented from the SPU, a different solution is used. A probe accesses the well, and from that access a flexitube is used to depressurize the line from the ANM, and there is consequent breakup of the hydrate. However, that solution takes months, and has an extremely high cost.

In the case of obstructions caused by paraffin, the usual approach is to use a cleaning pig before the paraffin obstructs the entire duct. Eventually the pig gets stuck during this operation. In cases in which the pig gets stuck or there is complete obstruction due to paraffin, there is not a common solution. In these cases, experimental solutions may be tried, or the entire flexible line is changed out, or it is hoisted and repaired when it is a rigid line. These are slow and costly operations. In addition, from the time the obstruction occurs until its complete removal, there is a loss of income associated with the interrupted production.

Documents US200521 7855A1, U.S. Pat. No. 6,415,722B1, and US20071 51475A1 refer to various types of equipment and methods to unblock ducts, as discussed below.

US2005 217855A1 reveals a pig-type tool to unblock a duct using chemical reagents in liquid form, in order to dissolve the hydrates and paraffins that block the regular passage of fluids through the tubing. It also reveals a method and a device to remove a hydrate obstruction from a tube in which a pig, which is connected to an umbilical that extends to the surface, is moved inside the tubing until it is close to the hydrate obstruction, and then a fluid with hydrate-dissolving properties is pumped through the umbilical. Note that this document uses a conventional pig for movement inside the duct, and a single reagent fluid coming directly from the surface. It does not present the possibility of this pig receiving two fluids, mixing them, and creating an exothermic reaction, and launching that mixture to dissolve the blockages caused by the hydrates. This document is, therefore, different from the matter that is the purpose of the present invention.

US2005 217855A1 does not reveal the injection of multiple reagents in a controlled manner, in independent conductors, with control of the cleaning reaction. In the present invention, solution A is moved through a line, and solution B through another, and they are injected into a reactor in a controlled manner directly into the area to be unblocked. The present invention uses a robot which, regardless of the flow availability for movement in the duct to be unblocked, control valves and a diffusor to control the reaction, allows action directly against the obstruction.

U.S. Pat. No. 6,415,722B1 reveals remotely controlled equipment with the capacity to be moved inside tubing or other confined cylindrical vessels, pulling an umbilical, and transporting accessories. It basically consists of a body and a passage bar that are equipped with heads. Those heads may be attached to the interior wall of the conduit or released alternately through manual or automatic commands. The vehicle has various safety devices to prevent it from getting stuck inside the tubing in abnormal situations. That invention makes it possible to take tools or materials to a remote point inside the tubing in order to perform various operations. It illustrates a remotely controlled locomotion device, and it is capable of transporting accessories and of performing various operations. That document does not reveal the possibility of using independent reagents, mixing them, and the result of that reaction being applied directly to the obstruction to unblock it. The problem that is the subject of U.S. Pat. No. 6,415,722B1 is also different from the matter that is the purpose of the present invention.

US2007 151475A1 reveals a vehicle for locomotion through a duct, comprising a forward mooring device and an aft mooring device, where each device is provided with a wall-mooring mechanism to attach selectively to the wall of the duct and to keep the respective element in a stationary position inside the duct. Hydraulic cylinder-type extendable elements connect the forward and aft devices, generating relative movement between them which, associated with the mooring device, allows the array to be moved. Each mooring mechanism on the wall comprises a plurality of rods that extend beyond the respective device. Each rod comprises a surface that is appropriate for attaching to the wall, an independent actuator per rod that activates each of the legs for coordinated extension inside the duct. One function it illustrates is the use of a rotating cutter mounted on the front of the vehicle to clear obstructions in the duct. That document also illustrates the use of this locomotion device for various other operations.

The locomotion device illustrated in US2007 151475A1 differs in design from what is presented in this invention, and it does not reveal the possibility of receiving chemical reagents and mixing them, causing a controlled chemical reaction, using the chemical reaction to dissolve the blockages caused by the hydrates and paraffins. The problem that is the subject of US2007 151475A1 is different from the matter that is the subject of this invention.

BRIEF DESCRIPTION OF THE DRAWINGS

The present invention will be described in greater detail below, with reference to the attached drawings, which in a manner not limiting to the inventive scope, represent a preferential embodiment of execution. Therefore.

DETAILED DESCRIPTION OF THE INVENTION

Figure 1:
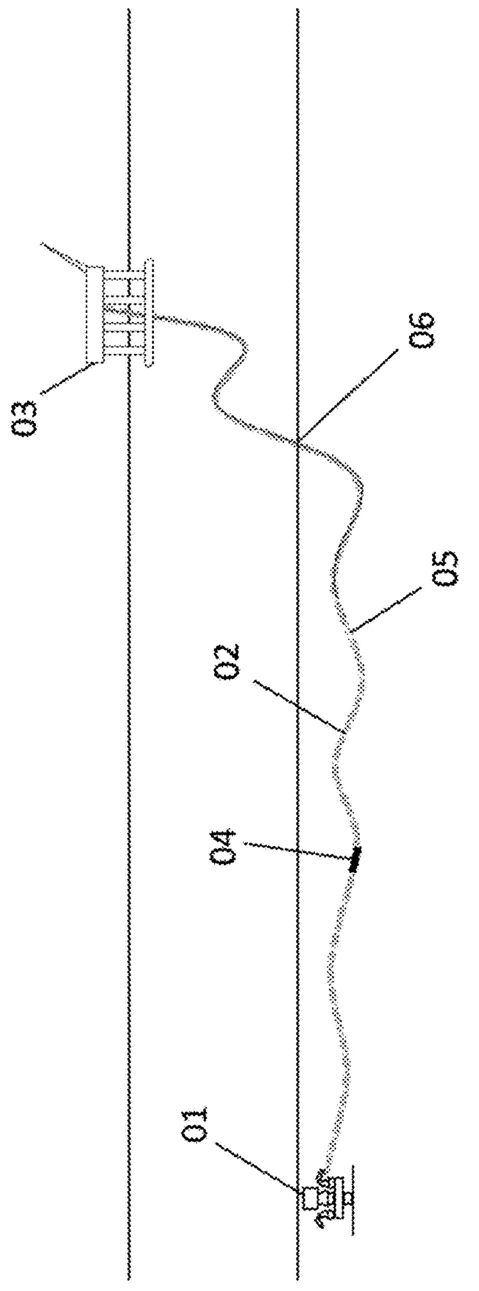
FIG. 1 presents an overview of undersea production systems and of the system proposed by the present invention.

For the purposes of the present invention, undersea wells (01) are interconnected to Stationary Production Units (SPUs) (03) through rigid or flexible ducts (02). Additionally, those units (03) may be interconnected to other units or to stations on land, also by rigid or flexible ducts (02). Those ducts may eventually be restricted or blocked (04), preventing normal production or the transfer of fluids. That system is shown in detail in FIG. 1.

Figure 2:
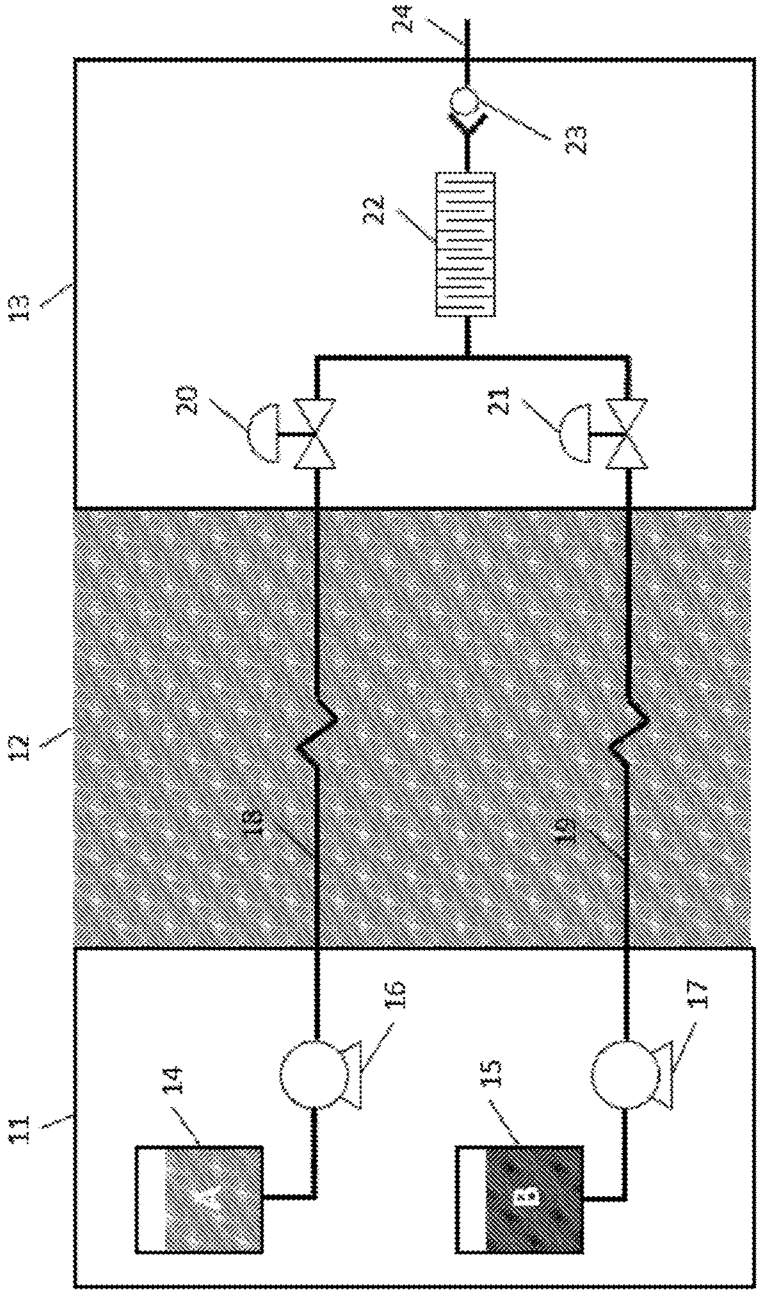
FIG. 2 presents an overview of the unblocking system proposed by the present invention.

To eliminate that blockage in a controlled manner, a system that extends from the SPU is used (11), passing inside the umbilical (12) and going to the tool (13). On the SPU (11), there is at least one reservoir for Solution A (14), and optionally other reservoirs for other solutions, such as, for example, a reservoir for Solution B (15). That optional configuration with two fluids is the solution shown in detail in FIG. 2.

Additionally, there is a pump for Solution A (16) and a pump for Solution B (17). Those pumps allow fluids to be injected in a controlled manner. In the umbilical, each solution is moved by a hydraulic line, Solution A through one line (18) and Solution B through another (19) in the same umbilical. On the robot, control valves allow the injection of Solution A (20) and Solution B (21), or they reach the blockage. The released solution or the released solutions are moved to the reactor (22), where they eventually react. They then pass through a retention valve (23), which prevents the entry of fluid from the line to be unblocked, to inside the reactor. Next, they pass through the diffusor (53), which allows the fluids to exit the line.

Figure 3:
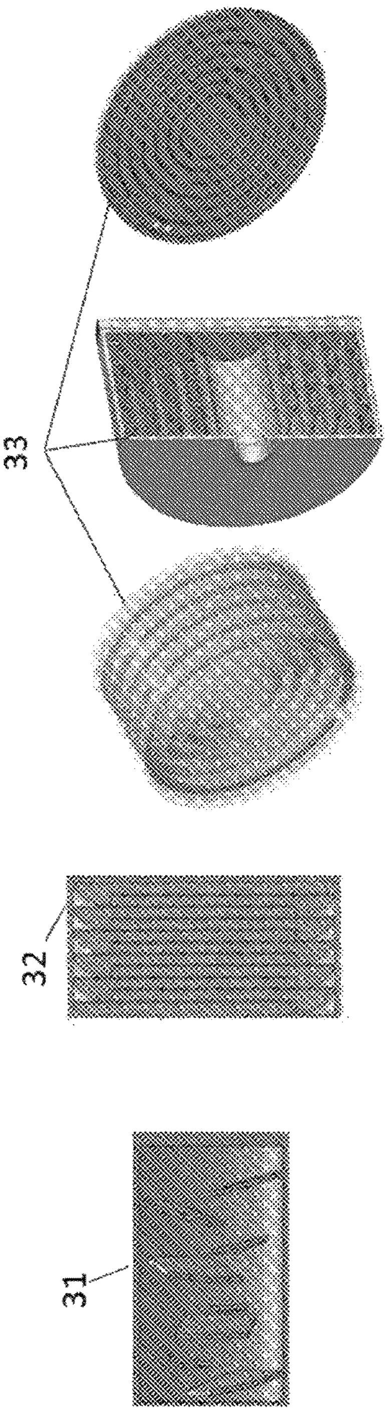
FIG. 3 presents different configurations for the reactor of the present invention.

The reactor (22), according to the present invention, may assume various configurations, such as, for example, a random configuration (31), labyrinth (32) or a baffle configuration (33), as shown in FIG. 3.

Figure 4:
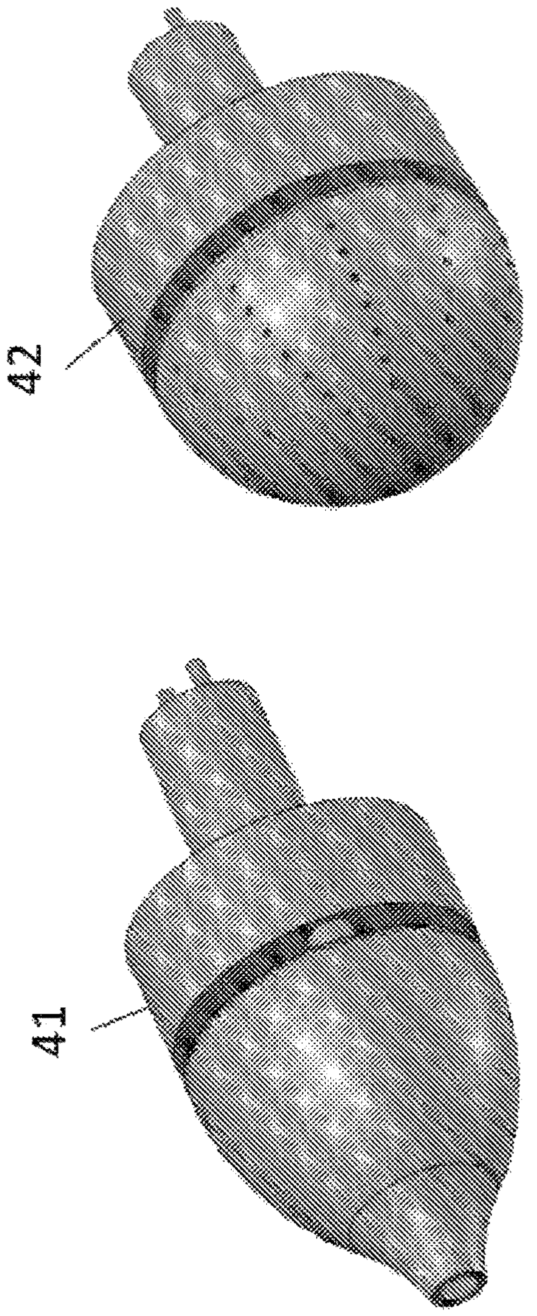
FIG. 4 presents different configurations for the diffusor of the present invention.

The diffusor (53) according to the present invention, may also assume different configurations, such as, for example, a concentrated diffusor (41) and a homogeneous diffusor (42), as shown in FIG. 4.

Figure 5:
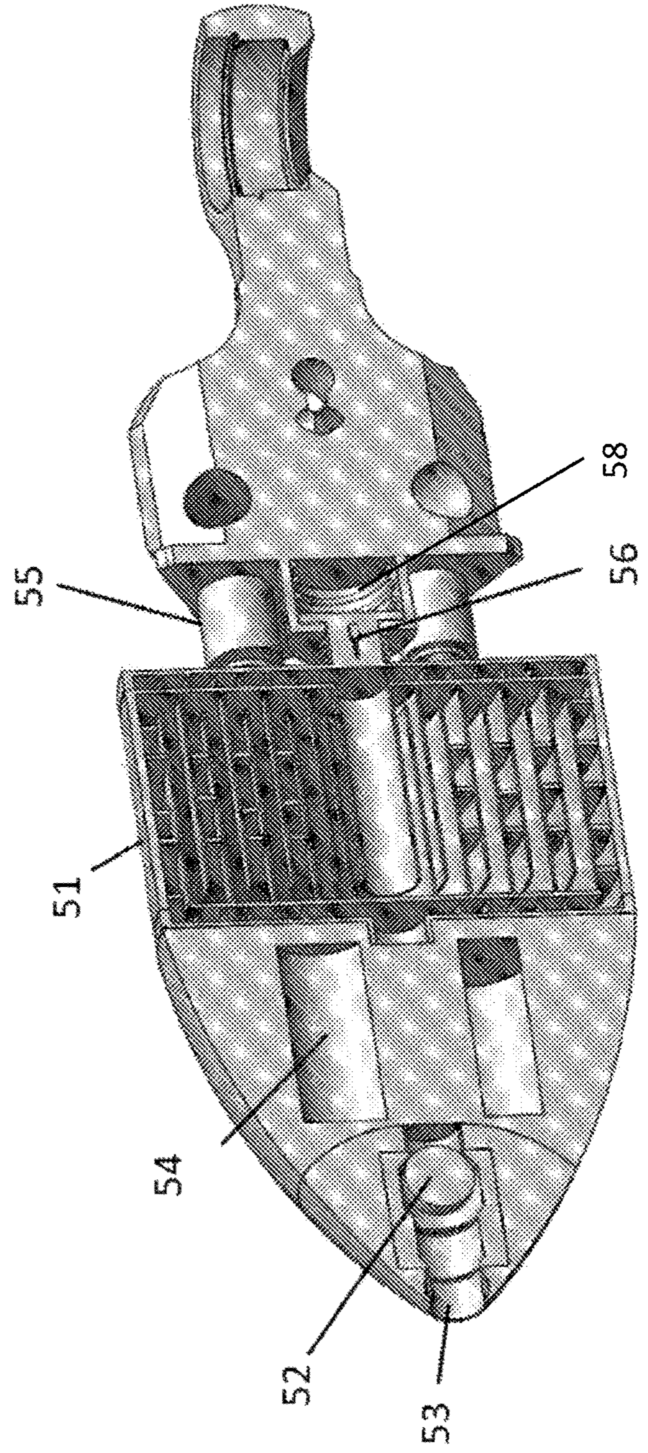
FIG. 5 presents an optional configuration for the system of the present invention.

FIG. 5 shows an optional configuration for the system, with the lines reaching a labyrinth-type reactor (51). From the reactor, the system passes through the retention valve (52) and exits through the diffusor (53) At FIG. 5 we also see pressure and temperature sensors (54), and a hall sensor (56), which is a sensor to identify a contact with the obstruction.

Note that the present invention proposes the use of a tool (13), connected to a locomotion device, for example, a robot, with an umbilical cable (06). That tool will provide a controlled reaction near the obstruction in order to cause its removal, using an injection and control system to generate the controlled reaction.

Solutions A and B used in the present invention may be two components which, working together, generate a highly exothermic reaction, such as, for example, sodium nitrite and ammonium chloride in an acid medium. In this condition, upon reacting the components release heat, allowing dissolution of the hydrate after removing it from its stability envelope. It may also dissolve the paraffin, by taking the temperature to values above the crystal appearance start temperature (TIAC). As there are two pumps (16 and 17) and two valves (20 and 21) to independently control the discharge from the components, the process may be controlled through the use of sensors near the unblocking system, thus avoiding loss of control of reactions, and possible damage to the line that is to be unblocked. This prevents, for example, polymer layers from the flexible line (02) from breaking down.

The present invention may also be used to perform other reactions in a controlled manner inside tubing. Such reactions may be used, in addition to cleaning operations, for controlled injection of corrosion inhibitors, foaming agents, anti-foaming agents, etc.

The reactor (22) may assume different configurations, such as, for example, a random packing configuration (31), baffle (32), or labyrinth (33). In the last case, sequential labyrinths may be used to increase the effectiveness of the mixture and to reduce the reaction time. The diffusor (24) may also assume different configurations, such as, for example, a concentrated diffusor (41) and a homogeneous diffusor (42). The system may optionally have an associated system to identify the obstruction, for example through a spring (58), and it alters the position of the sensor hall (56). That alteration in the position of the sensor hall alters the magnetic flow over it and indicates the presence of the obstruction. The system may also optionally have an impact-buffering system (55) arising from release of the pressure confined by the obstructions.

Note that the above-mentioned system was tested in a laboratory. The test consisted of continuous pumping of two solutions of sodium nitrate and ammonium chloride in a tube cooled to 4° C. During that test, the components reacted and heated the region in a controlled manner, allowing a significant increase in temperature.

It should be noted that despite the present invention having been described in relation to the attached drawings, it may undergo modifications and adaptation by technicians versed in the matter, depending on the specific situation, but as long as it is within the inventive scope defined herein.

The invention claimed is:

1. A system for unblocking or cleaning ducts by means of a controlled local reaction, the system comprising:

a tool capable of allowing a controlled reaction to take place near a blockage;

a closed-loop control system;

control valves configured to be controlled by the closed-loop control system, the control valves configured to clean or remove one or more obstructions from inside one or more lines by controlling injection of a flow of a first solution and a second solution into a reactor, the first solution and the second solution configured to react with one another within the reactor;

a diffusor configured to discharge a mixture of the first solution and the second solution to the one or more lines; and a hall sensor operatively coupled to a spring, the hall sensor configured to identify movement of the spring, where such movement is indicative of physical contact of the diffusor with the one or more obstructions, the hall sensor being coupled to the diffusor.

2. The system of claim 1, wherein the control valves are configured to block the discharge of the first solution and the second solution when the reaction gets out of control.

3. The system of claim 1, wherein the first solution and the second solution create an exothermic reaction when the first solution and the second solution react with one another.

4. The system of claim 1, further comprising a temperature sensor.

5. The system of claim 1, wherein the closed-loop control system is configured to control temperature based on a value provided by a temperature sensor, the closed- loop control system being configured to adjust discharge from pumps.

6. The system of claim 1, wherein the reactor has configurations selected from the group consisting of a random packing, labyrinth, and baffles.

7. The system of claim 1, wherein the diffusor has configurations selected from the group consisting of a concentrated diffusor and a homogeneous diffusor.

8. The system of claim 1, further comprising pressure and temperature sensors.

9. The system of claim 1, wherein the one or more obstructions comprise hydrate or paraffin.

* * * * *